United States Patent
Huang

(10) Patent No.: US 11,776,292 B2
(45) Date of Patent: Oct. 3, 2023

(54) OBJECT IDENTIFICATION DEVICE AND OBJECT IDENTIFICATION METHOD

(71) Applicant: Wistron Corp., New Taipei (TW)

(72) Inventor: Kuo-Lun Huang, New Taipei (TW)

(73) Assignee: WISTRON CORP, New Taipei (TW)

( * ) Notice: Subject to any disclaimer, the term of this patent is extended or adjusted under 35 U.S.C. 154(b) by 451 days.

(21) Appl. No.: 17/249,803

(22) Filed: Mar. 15, 2021

(65) Prior Publication Data

US 2022/0198181 A1 Jun. 23, 2022

(30) Foreign Application Priority Data

Dec. 17, 2020 (TW) ................................ 109144640

(51) Int. Cl.
*G06V 40/10* (2022.01)
*G06T 7/246* (2017.01)
(Continued)

(52) U.S. Cl.
CPC ............ *G06V 40/10* (2022.01); *G06F 18/214* (2023.01); *G06N 3/045* (2023.01); *G06N 3/08* (2013.01);
(Continued)

(58) Field of Classification Search
CPC .... G06V 10/764; G06V 40/10; G06V 40/161; G06V 20/52; G06V 40/103; G06V 40/172; G06V 10/774; G06V 2201/06; G06V 40/171; G06V 10/25; G06V 10/44; G06V 20/64; G06V 40/16; G06V 40/169;
(Continued)

(56) References Cited

U.S. PATENT DOCUMENTS

| | | | |
|---|---|---|---|
| 11,694,064 B1 * | 7/2023 | Gou | G06V 10/764 706/15 |
| 11,694,088 B2 * | 7/2023 | Raichelgauz | G06N 3/048 706/20 |

(Continued)

FOREIGN PATENT DOCUMENTS

| | | |
|---|---|---|
| CN | 103426008 A | 12/2013 |
| CN | 105654055 A | 6/2016 |

(Continued)

OTHER PUBLICATIONS

Squeezed Deep 6DoF Object Detection using Knowledge Distillation (published on Jul. 19, 2020).

(Continued)

*Primary Examiner* — Ajibola A Akinyemi
(74) *Attorney, Agent, or Firm* — McClure, Qualey & Rodack, LLP

(57) ABSTRACT

An object identification method includes: generating a tracking sample and an adversarial sample; training a teacher model according to the tracking sample; and initializing a student model according to the teacher model. The student model adjusts a plurality of parameters according to the teacher model and the adversarial sample, in response to the vector difference between the output result of the student model and the output result of the teacher model being lower than the learning threshold, the student model is deemed to have completed training, and the student model is extracted as an object identification model.

20 Claims, 5 Drawing Sheets

(51) Int. Cl.
*G06N 3/08* (2023.01)
*G06F 18/214* (2023.01)
*G06N 3/045* (2023.01)

(52) U.S. Cl.
CPC .... *G06T 7/248* (2017.01); *G06T 2207/20081* (2013.01); *G06T 2207/20084* (2013.01)

(58) Field of Classification Search
CPC .... G06V 10/255; G06V 10/50; G06V 10/751; G06V 10/776; G06V 10/82; G06V 10/98; G06V 20/00; G06V 20/56; G06V 20/58; G06V 40/162; G06V 40/167; G06V 40/168; G06V 40/173; G06V 40/28; G06V 10/145
USPC .......................................................... 382/181
See application file for complete search history.

(56) References Cited

U.S. PATENT DOCUMENTS

2020/0134506 A1* 4/2020 Wang ..................... G06N 3/088
2020/0334538 A1   10/2020 Meng et al.

FOREIGN PATENT DOCUMENTS

| | | |
|---|---|---|
| CN | 103559237 B | 2/2017 |
| CN | 107392255 A | 11/2017 |
| CN | 107392319 A | 11/2017 |
| CN | 110414415 A | 11/2019 |
| CN | 111967529 A | 11/2020 |
| EP | 3648014 A1 | 5/2020 |

OTHER PUBLICATIONS

A Simple Semi-Supervised Learning Framework for Object Detection (published on Dec. 3, 2020).
Fast vehicle detection in UAV images (published on May 18, 2017).
Search report and Office Action of its corresponding EP patent application 21178953.2 dated Mar. 28, 2022.
Chinese language office action dated Mar. 3, 2022, issued in application No. TW 109144640.

* cited by examiner

OBJECT IDENTIFICATION DEVICE AND OBJECT IDENTIFICATION METHOD

CROSS REFERENCE TO RELATED APPLICATIONS

This Application claims priority of Taiwan Patent Application No. 109144640, filed on Dec. 17, 2020, the entirety of which is incorporated by reference herein.

BACKGROUND OF THE INVENTION

Field of the Invention

The present disclosure relates to an identification device and an identification method, in particular, to an object identification device and an object identification method.

Description of the Related Art

At present, most artificial intelligence (AI) model labeling work is independently contracted by specialized companies to manually perform labeling operations, especially those in China, India, countries in Southeast Asia, and other countries. There are more and more companies that specialize in manual labeling. Before training all AI object identification models on the market, a large amount of data must be accumulated and a large amount of manual labeling is required. Therefore, it is very labor-intensive and manual labeling requires a lot of time.

Therefore, how to use an automatic label generation tool to generate a large number of pictures and automatically label them has become one of the problems to be solved in this field.

BRIEF SUMMARY OF THE INVENTION

In accordance with one feature of the present invention, the present disclosure provides an object identification device that includes a processor and a storage device. The processor is configured to access the programs stored in the storage device to implement a pre-processing module, a teacher model training module, and a student model training module. The pre-processing module is configured to generate a tracking sample and an adversarial sample. The teacher model training module is configured to use the tracking sample to train a teacher model. The student model training module is configured to initialize a student model according to the teacher model. The student model adjusts a plurality of parameters according to the teacher model and the adversarial sample, in response to a vector difference between an output result of the student model and an output result of the teacher model being lower than the learning threshold, the student model is deemed to have completed training, and the student model is extracted as an object identification model.

In accordance with one feature of the present invention, the present disclosure provides an object identification method. The object identification method includes: generating a tracking sample and an adversarial sample; training a teacher model according to the tracking sample; and initializing a student model according to the teacher model. The student model adjusts a plurality of parameters according to the teacher model and the adversarial sample, in response to a vector difference between an output result of the student model and an output result of the teacher model being lower than the learning threshold, the student model is deemed to have completed training, and the student model is extracted as an object identification model.

Based on the above, the object identification device and object identification method ensure that the number of convolutional layers and the number of neurons of the student model as the object identification model are lower than the number of convolutional layers and the number of neurons of the teacher model. Therefore, the object identification model has model simplicity. Furthermore, the object identification device and the object identification method use adversarial samples in the process of establishing the student model. This can make the object recognition model have model robustness. In the entire process of generating a student model, the number of manually labeled samples required is much lower than the number of adversarial samples. Therefore, the object identification device and object identification method dilute the number of manual labeled sample to reduce the time, resources, and manpower required for labeling. In this way, the object identification device and the object identification method only need to input a video or multiple images of the target object in any environment to automatically track and label a large number of objects. Therefore, the most time-consuming labeling step in the field of artificial intelligence object identification is solved. As such, it is possible to efficiently generate a large number of training pictures and labels, and to achieve the effect of automatic labeling, without taking a lot of manual labeling time.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
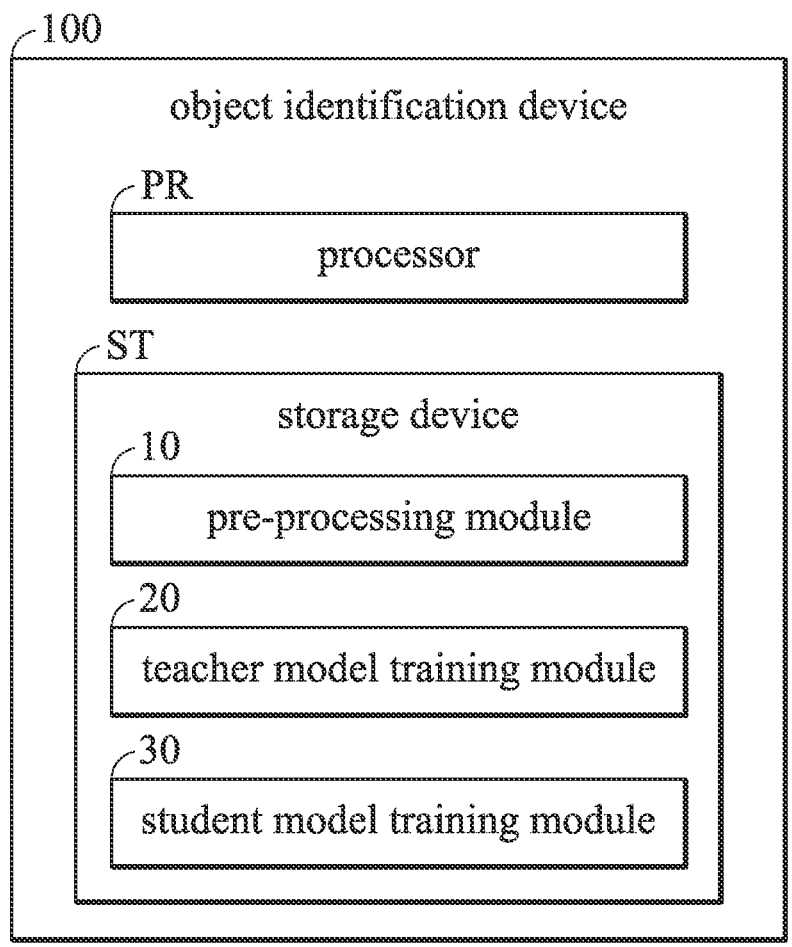
FIG. 1 is a block diagram of an object identification device in accordance with one embodiment of the present disclosure.

Please refer to FIG. 1, FIG. 1 is a block diagram of an object identification device 100 in accordance with one embodiment of the present disclosure. The object identification device 100 includes a processor PR and a storage device ST. In one embodiment, the processor PR accesses and executes programs stored in the storage device ST to implement a pre-processing module 10, a teacher model training module 20, and a student model training module 30. In one embodiment, the pre-processing module 10, the teacher model training module 20, and the student model training module 30 can be implemented by software or firmware separately or together.

In one embodiment, the storage device ST can be implemented by a read-only memory, a flash memory, a floppy disk, a hard disk, a compact disk, a flash drive, a magnetic tape, a network accessible database, or a storage medium having the same function by those skilled in the art.

In one embodiment, the pre-processing module 10, the teacher model training module 20, and the student model training module 30 can be implemented separately or together by one or more processor. The processor can be composed of integrated circuits such as a micro controller, a microprocessor, a digital signal processor (DSP), and a Field Programmable Gate Array (FPGA), Application Specific Integrated Circuit (ASIC) or a logic circuit to implement. In one embodiment, the pre-processing module 10, the teacher model training module 20, and the student model training module 30 can be implemented using hardware circuits separately or together. For example, the pre-processing module 10, the teacher model training module 20, and the student model training module 30 can be composed of active components (such as switches, transistors) and passive components (such as resistors, capacitors, and inductors). In one embodiment, the processor PR is used to access the respective calculation results of the pre-processing module 10, the teacher model training module 20, and the student model training module 30 in the storage device ST.

Figure 2:
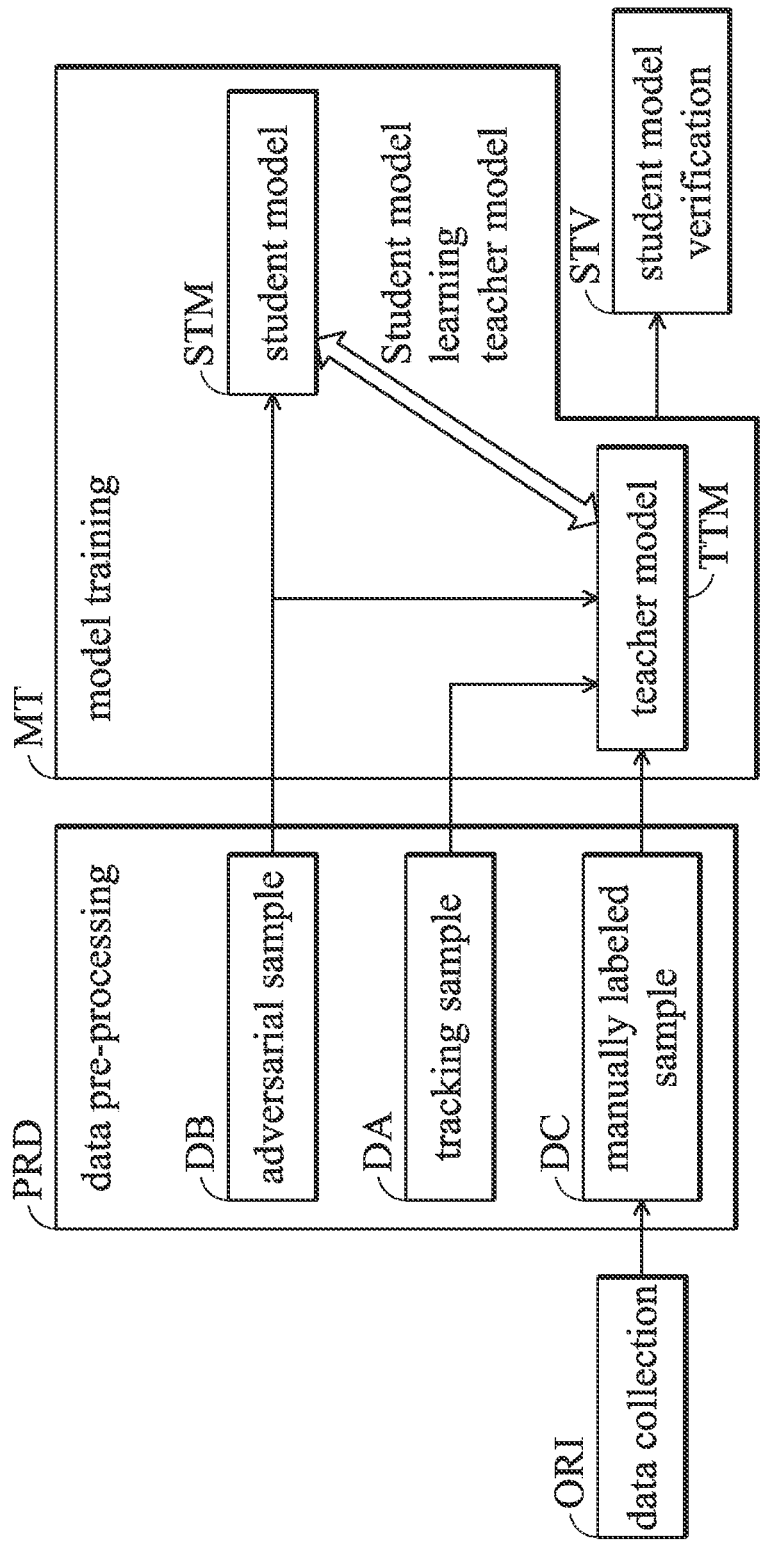
FIG. 2 is a schematic diagram of an object identification method according to an embodiment of the present invention.
Figure 3:
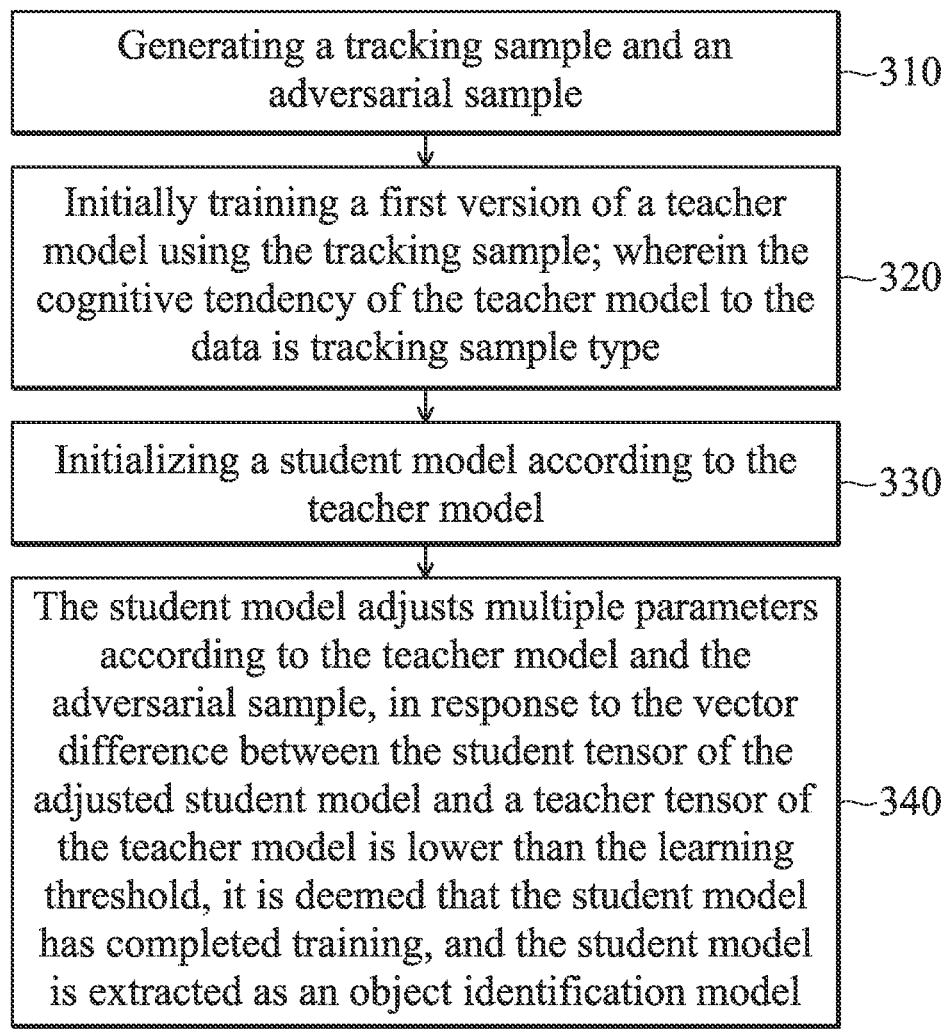
FIG. 3 is a flowchart of an object identification method according to an embodiment of the present invention.

Please refer to FIGS. 2 to 3, FIG. 2 is a schematic diagram of an object identification method 200 according to an embodiment of the present invention. FIG. 3 is a flowchart of an object identification method 300 according to an embodiment of the present invention. The object recognition method 200 and the object recognition method 300 can be implemented by the components shown in FIG. 1. It can be seen from FIG. 2, the object identification method 200 can be divided into processes such as data collection ORI, data pre-processing PRD, model training MT, and student model verification STV. The steps in FIG. 3 are used in conjunction with FIG. 2 for description below.

In one embodiment, the processor PR is used to access the pre-processing module 10, the teacher model training module 20, and the student model training module 30. Or, the processor PR is used to access and execute the program/algorithm in the storage device ST to implement pre-processing Module 10, teacher model training module 20, and student model training module 30. In one embodiment, when the pre-processing module 10, the teacher model training module 20, and the student model training module 30 are implemented by hardware (for example, a chip or a circuit), these module can calculate by themselves after receiving data or signals, and the processing result is returned to the processor PR. In one embodiment, when the pre-processing module 10, the teacher model training module 20, and the student model training module 30 are implemented by software (for example, an algorithm), the processor PR executes the algorithms in the pre-processing module 10, the teacher model training module 20, and the student model training module 30 to obtain processing results.

In step 310, the pre-processing module 10 is used to generate a tracking sample and an adversarial sample.

In one embodiment, the pre-processing module 10 receives the data collection ORI (the data collection ORI can be, for example, taken through a lens, or obtained by accessing multiple images or a video stored in the database), and then the user uses object-recognized input interfaces (such as touch screens, keyboards, mouse, etc.) to select a few frames of the video or select objects (such as people) in several images. The pre-processing module 10 then tracks a framed object in each frame according to an optical flow algorithm to generate tracking samples DA. The optical flow algorithm is about tracking objects in the field of view, describing the movement of the observation target, surface or edge relative to the movement that relative to an observer. After the user selects a few frames or images to define the framed objects, the optical flow algorithm can track the framed objects in each frame or other images to generate the tracking sample DA (that is, tracing in multiple images after the image with the framed object is generated, the object frame data corresponding to the framed object is generated. For example, a person is framed in the first image, even in the second image, the person moves about 1 cm relative to the first image, the person can still be framed in the second image by using the optical flow algorithm, and so on, so that multiple images can be used to track the person's motion track to generate tracking samples DA). In another embodiment, tracking samples DA can be generated for objects of different types, and multiple tracking samples DA corresponding to objects of multiple types can be obtained.

In one embodiment, the tracking sample DA contains an Extensible Markup Language (XML) file relative to the frame selection position of the framed object in the original image. The content of the XML file is the center point coordinates (x, y) of the frame selection position labeled in the image, the width W of the frame selection position, the height H of the frame selection position and the object category (for example, a person). The tracking sample DA is used as a data set for training the teacher model TTM.

In one embodiment, the pre-processing module 10 adds a noise to the tracking sample DA to generate an adversarial sample DB.

In one embodiment, the pre-processing module 10 inputs the tracking sample DA into a generative adversarial network (GAN) or an adv-GAN to generate adversarial networks or generate an adversarial sample generation method to output the adversarial sample DB.

In one embodiment, the pre-processing module 10 extracts the image captures corresponding to the frame selection positions in the tracking sample DA, and inputs the images corresponding to the extracted frame selection positions into adv-GAN to enhance the number of images. The adv-GAN is used to add meaningful noise (that is, effective information that misleads the teacher model TTM) to at least a part of the tracking sample DA to generate a noise map, and then paste one or more noise maps back to the tracking sample DA to generate multiple different adversarial samples DB. For example, after adding noise to the image corresponding to the frame selection position and pasting it back to the original tracking sample DA to generate an adversarial sample DB, the user's naked eye can still see the extracted frame selection position containing the framed person. However, the probability that the frame selection position in the adversarial sample DB is determined as a cat by the teacher model TTM is 90%, and the probability of being determined as a person is 15%, and the parameters of the teacher model TTM are adjusted in the subsequent training steps (such as strengthen the weight of human characteristics) until it is trained to recognize the frame selection position in the adversarial sample DB as a person (for example, the probability of being determined as a cat by the teacher model TTM is 10%, and the probability of being determined as a person being is 95%). In another embodiment, the noise map pasted back to the tracking sample DA includes noise maps of images of different object categories (such as bottles, boxes, signs, etc.). The noise maps including different object categories are pasted back to the tracking sample DA, and the adversarial sample DB is generated. The subsequent training of the teacher model TTM using the adversarial sample DB will enable the teacher model TTM to recognize different types of objects that simultaneously exist in the image.

By generating the adversarial sample DB, the number of samples used for training the teacher model TTM can be increased, and by increasing the noisy adversarial sample DB and corresponding correct answers, the teacher model TTM can automatically adjust the parameters and improve the accuracy of determining objects. In another embodiment, the adversarial sample DB can add different types of object images. The noise is added to the different types of object images, and paste these object images into the adversarial sample DB, so that the trained teacher model TTM can recognize multiple objects.

In step 320, the teacher model training module 20 is used to initially train a first version of a teacher model TTM using the tracking sample DA, and the cognitive tendency of the teacher model TTM to the data is tracking sample DA type.

In one embodiment, the teacher model TTM is retrained with the adversarial sample DB data type. At this time, the neural parameters in the teacher model TTM are updated towards the adversarial sample DB. The teacher model TTM can be applied to some object detection models, such as the YOLO series. This type of one-stage prediction can increase the accuracy of the model. The reason is that when training the teacher model TTM, the data type has been divided into two dimensions for retraining, so this domain adaptation training method reduces the possibility of gradient confusion. Since the YOLO model requires a lot of training data, the robustness of the neural network of the teacher model TTM can be increased by inputting the tracking sample DA and a large number of adversarial samples DB. In one embodiment, YOLO is an object detection method. A convolutional neural networks (CNN) structure only needs to be performed on the image once to determine the location and type of the objects in the image, thereby increasing the recognition speed.

In step 330, the student model training module 30 initializes a student model STM according to the teacher model TTM.

In one embodiment, the model framework adopted by the student model STM is the same as the teacher model TTM. The size of the student model STM can be designed to have a smaller file storage capacity (for example, a smaller amount of weight parameters). In one embodiment, the neural framework construction methods of the student model STM and the teacher model TTM are similar and only part of the framework construction layer is reduced. For example, if the teacher model TTM is built using the YOLO model, the student model STM also uses the architecture of the YOLO model when it is initialized. In the subsequent steps, the student model STM will follow the teacher model TTM to learn. However, the input data of the teacher model TTM and the student model STM is adversarial sample DB. In the training process, the student model STM is trained to approach the teacher model TTM to improve the accuracy of the student model STM in identifying objects. The student model STM follows the teacher model TTM for learning. It means that the student model STM continuously adjusts multiple parameters, such as bias and multiple weights corresponding to multiple input samples. The student model STM makes the multiple output results (such as a student tensor including multiple probabilities) approach the output results of the teacher model TTM (such as a teacher tensor including multiple probabilities).

In one embodiment, the number of parameters set by the student model STM is lower than the number of parameters set by the teacher model TTM. In one embodiment, the number of convolutional layers and the number of neurons of the deep learning model set by the student model STM are lower than the number of convolutional layers and the number of neurons of the teacher model TTM. Therefore, the weight parameters corresponding to the number of convolutional layers and the number of neurons in the student model STM are also less than the weight parameters corresponding to the number of convolutional layers and the number of neurons in the teacher model TTM. As such, the storage space required by the student model STM is smaller than the storage space required by the teacher model TTM. Furthermore, since the number of convolutional layers and the number of neurons in the student model STM are also smaller than the teacher model TTM, the calculation speed of the student model STM will be faster than the teacher model TTM.

In step 340, the student model STM adjusts multiple parameters according to the teacher model TTM and the adversarial sample DB (the adversarial sample DB is the data for training the student model STM and the teacher model TTM, and the student model STM learns from the teacher model TTM), in response to the vector difference between the student tensor of the adjusted student model STM and a teacher tensor of the teacher model TTM is lower than the learning threshold (for example, 0.1), it is deemed that the student model STM has completed training, and the student model STM is extracted as an object identification model. In one embodiment, before extracting the student model STM as an object identification model, a more detailed method of improving the accuracy of the student model STM recognition may be included, which will be described in detail later.

In one embodiment, it can be seen from FIG. 2 that during the operation of the student model STM, the manually labeled sample DC is not directly input to the student model STM. Therefore, the student model verification STV can be performed by manually labeled sample DC. For example, the student model training module 30 inputs the manually labeled sample DC (for example, a framed person) into the student model STM, and the correct output of the frame selection position of the student model STM is 99% of the person and 0.1% of the cat, it can be considered that the accuracy of the student model STM is sufficient to identify the object.

In an embodiment, the parameters adjusted by the student model STM according to the teacher model TTM can be bias and multiple weights corresponding to the multiple inputs. The student tensor refers to the multiple probabilities output by the student model STM. For example, the probabilities of determining that the object of the frame selection position in the input image have a 70% probability of being a human, a 10% probability of being a cat, and a 10% probability of being a dog. In the same way, the teacher tensor refers to the multiple probabilities output by the teacher model TTM. For example, the probabilities of determining that the object of the frame selection position in the input image have a 90% probability of being a human, a 5% probability of being a cat, and a 5% probability of being a dog. The probability here refers to the probability that the frame selection position are human, cats, and dogs respectively, so these probabilities are all independent and unrelated to each other.

In one embodiment, the vector difference can be an implementation method of a loss function, and the method for calculating the vector difference can use mean square error (MSE) and mean absolute error (MAE) . . . and so on. In these methods, the predicted value (usually expressed as y) is, for example, a student tensor, and the true value (usually expressed as ŷ) is, for example, a teacher tensor, and the vector difference between the two is calculated. Since these methods are existing methods, they will not be repeated here. In one embodiment, the range of the vector difference is between 0 and 1.

In one embodiment, when the vector difference between the student tensor of the adjusted student model STM and a teacher tensor of the teacher model TTM is lower than the learning threshold (for example, 0.1), it is regarded as the student model STM completes the training, and then the student model STM is extracted as an object identification model. Since the student model STM has the characteristics of fast calculation speed and small storage space, and the student model STM approximates the vector difference to the teacher model TTM, the recognition accuracy of the student model STM is also as high as the teacher model TTM trained with a large amount of data.

In one embodiment, in step 340, the pre-processing module 10 is further included for receiving the manually labeled sample DC. When the vector difference between the student tensor of the student model STM and the teacher tensor of the teacher model TTM is lower than the learning threshold (for example, 0.2, here is only an example, the value can be adjusted according to the implementation), the manually labeled sample DC is input into the teacher model TTM to generate an advanced teacher model.

In some embodiments, when the vector difference between the student tensor of the student model STM and the teacher tensor of the teacher model TTM is lower than the learning threshold, it means that the execution results of the student model STM and the teacher model TTM are similar. Therefore, the teacher model TTM needs to be trained by manually labeling the sample DC (this is called advanced training). When the vector difference between the student tensor of the student model STM and the advanced tensor of the advanced teacher model is lower than the learning threshold, it means that the execution results of the student model STM and the advanced teacher model are similar. At this time, the student model STM is deemed to have been finished training.

In one embodiment, the teacher model training module 20 inputs the manually labeled sample DC into the advanced teacher model. When the vector difference (or loss function) between an advanced tensor output by the advanced teacher model and the manually labeled sample is less than the advanced threshold value, the advanced teacher model is deemed to have completed the training.

In one embodiment, the number of manually labeled samples DC is lower than the number of adversarial samples DB.

By inputting the manually labeled sample DC into the teacher model TTM, the teacher model TTM can learn the dependence of the labeled objects (such as human) on the background (such as street scenes). When the vector difference (or loss function) between an advanced tensor output by the advanced teacher model and the manually labeled sample is less than the advanced threshold value, the advanced teacher model is deemed to have completed the training. The teacher model training module 20 then uses the advanced teacher model to lead the student model TTM to approach the advanced teacher model, and the student model TTM will learn from the advanced teacher model again.

In one embodiment, the student model training module 30 adjusts the parameters of the student model TTM according to the advanced teacher model (the student model TTM learns from the advanced teacher model), for example, adjusting bias and/or adjusting multiple weights corresponding to multiple inputs. When the vector difference between the student tensor of the adjusted student model and an advanced teacher tensor of the advanced teacher model is lower than the learning threshold, it is deemed that the student model TTM has completed training, and the student model TTM is extracted as the object identification model.

In this way, the recognition rate of objects (such as human) in the image can be improved when the student model TTM analyzes the image of the actual environment.

In one embodiment, the stopping condition of step 340 is to repeat the operation of step 340 to a specific number of times (for example, preset to 70 times), which means that the student model STM is adjusted 70 times to make the student model STM accurate enough. The student model training module 30 extracts the student model STM as an object identification model.

Figure 4A:
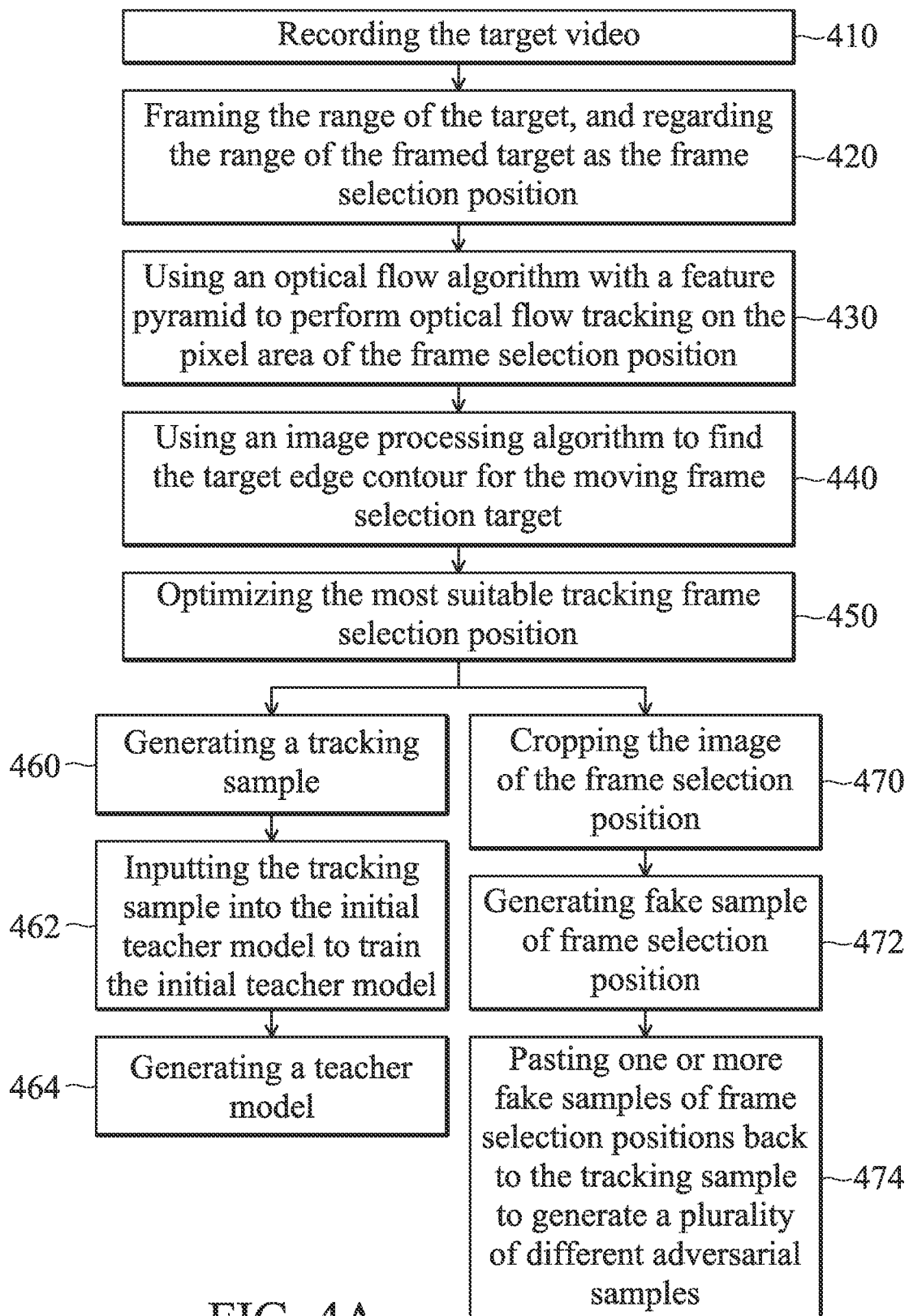
FIG. 4A is a schematic diagram of generating a teacher model and an adversarial sample according to an embodiment of the present invention.
Figure 4B:
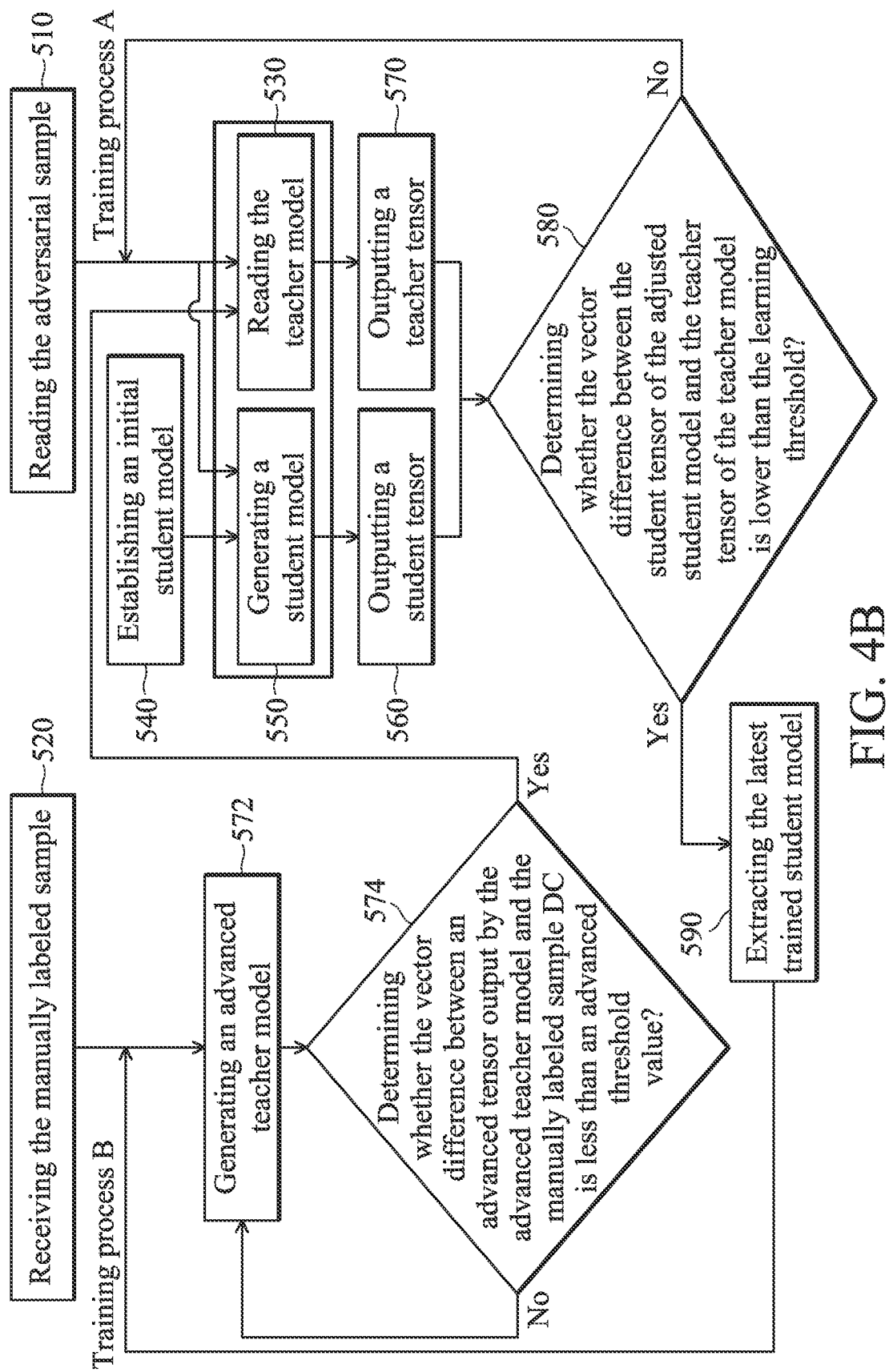
FIG. 4B is a flow chart of generating an object identification model according to an embodiment of the present invention.

Please refer to FIGS. 4A to 4B. FIG. 4A is a schematic diagram of generating a teacher model TTM and an adversarial sample DB according to an embodiment of the present invention. FIG. 4B is a flow chart of generating an object identification model according to an embodiment of the present invention.

In step 410, the target video is recorded. For example, one or more pedestrians walking on the road is recorded by a camera.

In step 420, the mouse is used to frame the range of the target, and the range of the framed target is regarded as the frame selection position. However, it is not limited to using a mouse. If the object identification device 100 includes a touch screen, the touch screen can receive the range of the framed target. For example, the user uses his/her finger to frame the selection target (for example, a person) on the touch screen. At this time, the pre-processing module 10 can know the length and width of the frame selection position of the frame selection target in the entire frame and the center point coordinates of the frame selection position, thereby generating manually labeled samples DC.

In one embodiment, in step 420, the user can perform frame selection for the frame selection targets in multiple frames or images, so that the pre-processing module 10 can know that the length, the width and the center point coordinates of the frame selection position of the frame selection targets in each frame or image.

In one embodiment, the user can select multiple types of frame selection targets (target object), for example, select and frame multiple persons or cats.

In step 430, the pre-processing module 10 uses an optical flow algorithm with a feature pyramid to perform optical flow tracking on the pixel area of the frame selection position.

In one embodiment, since the user has selected the frame selection position (for example, a person) of at least one frame, the pre-processing module 10 uses the optical flow algorithm to continue to track the frame selection position in subsequent frames (for example, if a person walks to the right in the next frame, the pre-processing module 10 uses the optical flow algorithm to track the person in current frame selection position (i.e., the next frame selection position)). The feature pyramid network is a feature extractor designed according to the concept of feature pyramid. The purpose of the feature pyramid network is to improve the accuracy and speed of finding the location of the frame selection position.

In step 440, the pre-processing module 10 uses an image processing algorithm to find the target edge contour for the moving frame selection target.

In step 450, the pre-processing module 10 optimizes the most suitable tracking frame selection position.

In one embodiment, the large moving displacement of the object may cause the aforementioned frame selection position to be too large or have noise. Therefore, by using, for example, a binarization algorithm, an edge detection algorithm, etc., the continuous edges of the object are found to find the target edge contour (for example, the contour of a person). For example, the processor PR uses the Open Source Computer Vision Library (open CV) for motion detection. Since the frame selection position has been binarized, the pre-processing module 10 can calculate the minimized frame selection position (minimize the rectangle). In this way, the processor PR can converge the frame selection position to an appropriate size according to the target edge contour as the most suitable tracking frame selection position, and then track the frame selection position to improve the accuracy of tracking.

In step 460, the pre-processing module 10 generates a tracking sample DA.

For example, the pre-processing module 10 then tracks a selected object in each frame according to an optical flow algorithm to generate a large number of automatically generated tracking samples DA. A large number of tracking samples DA can be automatically generated without manual frame selection.

In step 462, the pre-processing module 10 inputs the tracking sample DA into the initial teacher model to train the initial teacher model.

In one embodiment, the initial teacher model is only an architecture (for example, the architecture of the YOLO model).

In step 464, the teacher model training module 20 generates a teacher model TTM. This teacher model TTM has already learned the tracking sample DA.

In step 470, the pre-processing module 10 crops the image of the frame selection position. In other words, the pre-processing module 10 extracts the frame selection position from the entire frame or image.

In step 472, the pre-processing module 10 generates fake samples of frame selection positions.

In one embodiment, noise can be added to the image at the original frame selection position. Preferably, the adv-GAN algorithm can be used to add meaningful noise (that is, the effective information that misleads the teacher model TTM) to generate a noise map (that is, fake samples of frame selection positions).

In step 474, the pre-processing module 10 pastes one or more fake samples of frame selection positions back to the tracking sample DA to generate a plurality of different adversarial samples DB.

In this example, a large number of adversarial sample DBs can be generated to train the teacher model TTM to make the teacher model TTM adjust the parameters (let the teacher model TTM learn the adversarial sample DB), Until the teacher model TTM is trained to correctly identify the frame selection position in the adversarial sample DB.

It can be seen from the above that the tracking sample DA, the teacher model TTM, and the adversarial sample DB are generated through the process in FIG. 4A. Next, please refer to FIG. 4B. In an embodiment, the steps in FIG. 4B may also be executed by the processor PR.

In step 510, the pre-processing module 10 reads the adversarial sample DB, and inputs the adversarial sample DB to the student model STM and the teacher model TTM.

In step 520, the pre-processing module 10 receives the manually labeled sample DC.

In one embodiment, the adversarial sample DB accounts for approximately 70% of the overall sample amount, and the manually labeled sample DC accounts for approximately 30% of the overall sample amount.

In step 530, the pre-processing module 10 reads the teacher model TTM.

In step 540, the student model training module 30 establishes an initial student model. The initial student model at this time uses the same framework as the teacher model TTM.

In step 550, the student model training module 30 uses the adversarial sample DB to train the initial student model to generate a student model STM.

In one embodiment, the student model training module 30 initializes a student model STM according to the teacher model TTM. The student model STM uses the teacher model TTM as the standard, and adjusts parameters (the student model STM learns from the teacher model TTM) so that the output tensor of the student model STM is close to the output tensor of the teacher model TTM.

In one embodiment, the difference between the current student model STM and the previous version of the student model STM is less than an error threshold (for example, 5%), which means that the training of the current student model STM has tended to converge, and the step 560 is performed.

In step 560, the student model STM outputs a student tensor.

In step 570, the teacher model TTM outputs a teacher tensor.

In step 580, the processor PR determines whether the vector difference between the student tensor of the adjusted student model STM and the teacher tensor of the teacher model TTM is lower than the learning threshold. If yes, it means that the loss function between the student model STM and the teacher model TTM is relatively small and the gap is close, and the step 590 is performed. If not, the processor PR proceeds to training process A. In the training process A, the processor PR continues to let the student model STM learn the teacher model TTM, and continues to adjust the parameters of the student model STM.

In step 590, the processor PR extracts the latest trained student model STM.

After performing step 590, the processor PR proceeds to training process B. In training process B, the processor PR trains the teacher model TTM by manually labeled sample DC to improve the accuracy of the teacher model TTM, and then continues to let the student model STM learn the teacher model TTM, and continues to adjust the parameters of the student model STM.

In step 572, the teacher model training module 20 inputs the manually labeled sample DC into the teacher model TTM to generate an advanced teacher model.

In step 574, the teacher model training module 20 determines whether the vector difference between an advanced tensor output by the advanced teacher model and the manually labeled sample DC is less than an advanced threshold value. If not, step 572 is performed, the processor PR continues to input the advanced teacher model with the labeled label sample DC or the newly added manual labeled sample DC, and further trains the advanced teacher model. If so, it means that the advanced teacher model has completed the training, and the teacher model TTM in step 530 is replaced with the advanced teacher model, so that the student model STM continues to learn from the advanced teacher model, and the student model STM adjusts its parameters to approximate the tensor of the advanced teacher model. When the vector difference between the student tensor of the adjusted student model STM and an advanced teacher tensor of the advanced teacher model is lower than the learning threshold, it is deemed that the student model has completed training. The student model training module 30 extracts the student model as an object identification model.

In one embodiment, when an unknown image is input to the object identification model, the object identification model can identify or frame the position and/or quantity of the specific object in the unknown image. In another embodiment, the object identification model can identify or frame the positions and/or quantities of different types of objects in the unknown image.

Based on the above, the object identification device and object identification method ensure that the number of convolutional layers and the number of neurons of the student model as the object identification model are lower than the number of convolutional layers and the number of neurons of the teacher model. Therefore, the object identification model has model simplicity. Furthermore, the object identification device and the object identification method use adversarial samples in the process of establishing the student model. This can make the object recognition model have model robustness. In the entire process of generating a student model, the number of manually labeled samples required is much lower than the number of adversarial samples. Therefore, the object identification device and object identification method dilute the number of manual labeled sample to reduce the time, resources, and manpower required for labeling.

In this way, the object identification device and the object identification method only need to input a video or multiple images of the target object in any environment to automatically track and label a large number of objects. Therefore, the most time-consuming labeling step in the field of artificial intelligence object identification is solved. As such, it is possible to efficiently generate a large number of training pictures and labels, and to achieve the effect of automatic labeling, without taking a lot of manual labeling time.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An object identification device, comprising:
a processor; and
a storage device; wherein the processor is configured to access programs stored in the storage device to implement a pre-processing module, a teacher model training module, and a student model training module; wherein
the pre-processing module is configured to generate a tracking sample and an adversarial sample;
the teacher model training module is configured to use the tracking sample to train a teacher model; and
the student model training module is configured to initialize a student model according to the teacher model;
wherein the student model adjusts a plurality of parameters according to the teacher model and the adversarial sample, in response to a vector difference between an output result of the student model and an output result of the teacher model being less than a learning threshold, the student model is deemed to have completed training, and the student model is extracted as an object identification model.

2. The object identification device of claim 1, wherein a number of convolutional layers and a number of neurons of a deep learning model configured by the student model is lower than a number of convolutional layers and a number of neurons of the teacher model, and a number of weight parameters corresponding to the number of convolutional layers and the number of neurons of the student model is also lower than a number of weight parameters corresponding to the number of convolutional layers and the number of neurons of the teacher model.

3. The object identification device of claim 1, wherein the pre-processing module is further configured to receive a manually labeled sample, in response to the vector difference between the output result of the student model and the output result of the teacher model being lower than the learning threshold, the teacher model training module inputs the manually labeled sample into the teacher model for training, so as to generate an advanced teacher model.

4. The object identification device of claim 3, wherein the teacher model training module inputs the manually labeled sample into the advanced teacher model, and in response to a vector difference between a post-training tensor output by the advanced teacher model and the manually labeled sample being lower than an advanced threshold value, the advanced teacher model is deemed to have completed the training.

5. The object identification device of claim 3, wherein the student model training module adjusts the parameters of the student model according to the advanced teacher model, and in response to the vector difference between the output result of the student model and the output result of the advanced teacher model being lower than the learning threshold, the student model is deemed to have completed training, and the student model is extracted as the object identification model.

6. The object identification device of claim 5, wherein the student model training module adjusts the parameters of the student model according to the advanced teacher model, and in response to a vector difference between a student tensor of the student model and a teacher tensor of the advanced teacher model being lower than the learning threshold, the student model is deemed to have completed training, and the student model is extracted as the object identification model.

7. The object identification device of claim 1, wherein the pre-processing module tracks a frame-selected object in each frame according to an optical flow algorithm to generate the tracking sample;
the pre-processing module adds a noise to the tracking sample or inputs the tracking sample into a generative adversarial network (GAN) to generate the adversarial sample.

8. The object identification device of claim 7, wherein the pre-processing module adds a noise map to the tracking sample, and the noise map includes images of different object types.

9. The object identification device of claim 1, wherein the student model adjusts a bias and a plurality of weights, so that the output result of the student model is close to the output result of the teacher model.

10. The object identification device of claim 1, wherein the output result output by the student model is a student tensor, and the output result output by the teacher model is a teacher tensor.

11. An object identification method, comprising:
generating a tracking sample and an adversarial sample;
training a teacher model according to the tracking sample; and
initializing a student model according to the teacher model;
wherein the student model adjusts a plurality of parameters according to the teacher model and the adversarial sample, and in response to a vector difference between an output result of the student model and an output result of the teacher model being lower than a learning threshold, the student model is deemed to have completed training, and the student model is extracted as an object identification model.

12. The object identification method of claim 11, wherein a number of convolutional layers and a number of neurons of a deep learning model configured by the student model is lower than a number of convolutional layers and a number of neurons of the teacher model, and a number of weight parameters corresponding to the number of convolutional layers and the number of neurons of the student model is also lower than a number of weight parameters corresponding to the number of convolutional layers and the number of neurons of the teacher model.

13. The object identification method of claim 11, further comprising:
receiving a manually labeled sample; and
in response to the vector difference between the output result of the student model and the output result of the teacher model being lower than the learning threshold, inputting the manually labeled sample into the teacher model for training, so as to generate an advanced teacher model.

14. The object identification method of claim 13, further comprising:
inputting the manually labeled sample into the advanced teacher model; and
in response to a vector difference between a post-training tensor output by the advanced teacher model and the manually labeled sample being lower than an advanced threshold value, the advanced teacher model is deemed to have completed the training.

15. The object identification method of claim 13, further comprising:
adjusting the parameters of the student model according to the advanced teacher model; and
in response to the vector difference between the output result of the student model and the output result of the advanced teacher model being lower than the learning threshold, the student model is deemed to have completed training, and the student model is extracted as the object identification model.

16. The object identification method of claim 15, further comprising:
adjusting the parameters of the student model according to the advanced teacher model; and
in response to a vector difference between the student tensor of the student model and the teacher tensor of the advanced teacher model being lower than the learning threshold, the student model is deemed to have completed training, and the student model is extracted as the object identification model.

17. The object identification method of claim 11, further comprising:
tracking a frame-selected object in each frame according to an optical flow algorithm to generate the tracking sample; and
adding a noise to the tracking sample or inputting the tracking sample into a generative adversarial network (GAN) to generate the adversarial sample.

18. The object identification method of claim 17, further comprising:
adding a noise map to the tracking sample; wherein the noise map includes images of different object types.

19. The object identification method of claim 11, wherein the student model adjusts the bias and a plurality of weights, so that the output result of the student model is close to the output result of the teacher model.

20. The object identification method of claim 11, wherein the output result output by the student model is a student tensor, and the output result output by the teacher model is a teacher tensor.

* * * * *